US008910957B1

(12) United States Patent
Hassell (10) Patent No.: US 8,910,957 B1
(45) Date of Patent: Dec. 16, 2014

(54) SELF-LOADING MINI DOLLY (71) Applicant: Curtis C. Hassell, Jacksonville, OR (US)

(72) Inventor: Curtis C. Hassell, Jacksonville, OR (US)

(*) Notice: Subject to any disclaimer, the term of this patent is extended or adjusted under 35 U.S.C. 154(b) by 189 days.

(21) Appl. No.: 13/629,475

(22) Filed: Sep. 27, 2012

(51) Int. Cl.
B60B 29/00 (2006.01)

(52) U.S. Cl.
USPC ............ 280/79.4; 414/429; 414/426; 254/14; 254/105; 254/108; 254/237; 254/244

(58) Field of Classification Search
None
See application file for complete search history.

(56) References Cited

U.S. PATENT DOCUMENTS

| 2,452,481 | A | * | 10/1948 | Morehead et al. ............ 414/428 |
| 2,551,483 | A | | 5/1951 | Bartoe |
| 2,920,773 | A | * | 1/1960 | Knabe .......................... 414/743 |
| 3,036,723 | A | | 5/1962 | McCormick et al. |
| 3,583,723 | A | * | 6/1971 | Nowell et al. ................ 280/79.4 |
| 4,186,938 | A | * | 2/1980 | Youngblood ................ 280/402 |
| 4,690,605 | A | | 9/1987 | Coccaro |
| 4,854,803 | A | | 8/1989 | Coccaro |
| 4,900,215 | A | | 2/1990 | Nowell |
| 5,044,645 | A | * | 9/1991 | Eltvik ......................... 280/79.4 |
| D346,252 | S | | 4/1994 | Jones |
| 5,709,520 | A | * | 1/1998 | Pish ............................. 414/427 |
| 5,732,960 | A | | 3/1998 | Elam |
| 5,893,571 | A | * | 4/1999 | Nowell ......................... 280/43 |
| 5,941,675 | A | * | 8/1999 | Orr ............................. 414/428 |
| D415,868 | S | | 10/1999 | Hewitt |
| 6,676,360 | B2 | * | 1/2004 | Springer et al. ............. 414/401 |
| 7,097,406 | B1 | * | 8/2006 | Gang ........................... 414/429 |
| D532,575 | S | | 11/2006 | Oberg |
| 7,232,138 | B2 | | 6/2007 | Shubert |
| 7,275,753 | B1 | * | 10/2007 | Ceccarelli et al. ........... 280/79.4 |
| 7,513,725 | B1 | * | 4/2009 | Bullock ......................... 410/10 |
| D600,873 | S | | 9/2009 | Bansik et al. |
| 7,815,201 | B2 | | 10/2010 | Ceccarelli, III et al. |

* cited by examiner

Primary Examiner — J. Allen Shriver, II
Assistant Examiner — Hilary L Johns
(74) Attorney, Agent, or Firm — Jerry Haynes Law (57) ABSTRACT A self-loading mini dolly includes a dolly frame; a front dolly arm carried by the dolly frame; a wheeled front axle carried by the front dolly arm; a front dolly platform carried by the front dolly arm, the front dolly platform selectively deployable between lowered and raised positions; a rear dolly arm carried by the dolly frame in spaced-apart relationship to the front dolly arm; a wheeled rear axle carried by the rear dolly arm; and a rear dolly platform carried by the rear dolly arm, the rear dolly platform selectively deployable between lowered and raised positions.

17 Claims, 8 Drawing Sheets

SELF-LOADING MINI DOLLY

CROSS-REFERENCE TO RELATED APPLICATIONS

This application claims the benefit of U.S. provisional application No. 61/623,511, filed Apr. 12, 2012, and entitled "Self-Loading Mini Dolly", which provisional application is incorporated by reference herein in its entirety.

FIELD OF THE INVENTION

The present disclosure generally relates to self-loading tow dollies, and more particularly to a self-loading mini dolly that can be used in a variety of towing applications.

BACKGROUND OF THE INVENTION

Tow truck operators commonly use self-loading tow dollies. When a tow truck is used to tow a vehicle, one end of the vehicle is lifted by the truck. The wheels on the other end of the vehicle typically remain on the pavement. Tow dollies may be used to lift the lower end of the towed vehicle such that the wheels of the tow dollies, instead of the wheels of the towed vehicle, contact the road. Accordingly, lifting all wheels of the towed vehicle from contact with the ground greatly diminishes the possibility of drive train damage and/or excessive wear to the towed vehicle during towing. This is especially true with all-wheel drive vehicles and electric motor driven vehicles.

Tow dollies for raising pairs of coaxial vehicle wheels typically employ a pair of frame-like bases for supporting pairs of dolly wheels. Such dolly bases are placed outside two vehicle wheels of one axle to be lifted or elevated; the two bases being cross connected by parallel spaced tubular axles are typically longitudinally adjustable to accommodate variations in vehicle wheel lateral spacing. Suitable mechanisms are provided for positioning the dolly wheels between a lowered position and a raised towing position which serves to elevate the towed vehicle prior to the actual towing operation. Suitable locking devices are provided for maintaining dolly wheels in desired elevated or lowered positions for storing or towing operations, respectively. Other known mechanisms without separate ratchet systems are employed for maintaining dolly wheels in elevated positions. U.S. Pat. No. 5,941,675 to Orr, fully incorporated herein by reference, shows and describes an exemplary tow dolly.

Tow dollies of the type described in U.S. Pat. No. 5,941,675 typically have several sections which are disengageable from one another for easy storage and transport of the tow dolly. For example, there are often two frame-like wheel assemblies where the dolly's wheels are mounted on spindle assemblies which are attached to the frame-like wheel assemblies. Brackets on the frame-like wheel assemblies accommodate axles that engage the wheels of the vehicle to be towed.

Tow dollies must have sturdy components that articulate in a manner when a car is lifted off the ground in just a few moments. Spindle assemblies are typically made of steel as are the brackets where the steel rail ends of the axles are fitted to complete assembly. This "steel on steel" construction permits steel dolly components to be welded together and has proved to be sturdy in the field. Over a period spanning nearly forty years, the steel self-loading tow dolly became the industry standard. Using all steel components and welding steel components together on the dolly frame results, however, in a heavy tow dolly that an operator must carry from the tow truck to the towed vehicle. Even when disassembled, the pieces of current tow dollies are heavy and cause strain on tow truck operators which may lead to back injuries and other health problems.

When tow truck operators hand carry self-loading tow dollies from and to a tow truck, weight is a key factor in eliminating back and other injuries. All steel constructed tow dollies are sturdy, but weight continues to be an issue. Thus, the need remains for an improved self-loading tow dolly configuration that is not only sturdy, but has the added benefit of weight reduction.

Often vehicles or motorcycles which need to be winched up the bed of a car carrier lack a suitable location for placement of the tow hook on the vehicle or motorcycle without potential damage to the vehicle. Moreover, newer vehicles with all-wheel drive, hybrid vehicles, and all-electric vehicles whose transmissions are locked, incur potential damage when winched up the bed of a car carrier. Additionally, the front end of low-clearance vehicles incur potential damage because of the load angle of the car carrier bed. It is an object of my invention to provide a self-loading mini dolly system that solves these problems.

SUMMARY OF THE INVENTION

The disclosure is generally directed to a self-loading mini dolly. An illustrative embodiment of the self-loading mini dolly includes a dolly frame; a front dolly arm carried by the dolly frame; a wheeled front axle carried by the front dolly arm; a front dolly platform carried by the front dolly arm, the front dolly platform selectively deployable between lowered and raised positions by a leverage bar; a rear dolly arm carried by the dolly frame in spaced-apart relationship to the front dolly arm; a wheeled rear axle carried by the rear dolly arm; and a rear dolly platform carried by the rear dolly arm, the rear dolly platform selectively deployable between lowered and raised positions by a leverage bar.

BRIEF DESCRIPTION OF THE DRAWINGS

The disclosure will now be made, by way of example, with reference to the accompanying drawings, in which like reference numerals refer to similar elements and in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front" and "rear" as used herein are intended for descriptive purposes only and are not necessarily intended to be construed in a limiting sense.

Referring to FIGS. 1-10 of the drawings, an illustrative embodiment of the self-loading mini dolly is generally indicated by reference numeral 1. The self-loading mini dolly 1 includes a generally elongated dolly frame 2. A generally elongated front dolly arm 40 and a generally elongated rear dolly arm 42 may extend from the dolly frame 2 in spaced-apart relationship to each other. The front dolly arm 40 and the rear dolly arm 42 may each be generally perpendicular to the longitudinal axis of the dolly frame 2 and may be generally parallel to each other. In some embodiments, a frame handle 5 may be provided on the dolly frame 2 for carrying and handling purposes.

A front dolly platform 8 may be provided on the front dolly arm 40 of the dolly frame 2. The front dolly platform 8 may have a generally elongated, flat, rectangular, blade-shaped configuration. The longitudinal axis of the front dolly platform 8 may be parallel to the longitudinal axis of the front dolly arm 40. Similarly, a rear dolly platform 24 is provided on the rear dolly arm 42 of the dolly frame 2. The rear dolly platform 24 may have a generally elongated, flat, rectangular, blade-shaped configuration. The longitudinal axis of the rear dolly platform 24 may be parallel to the longitudinal axis of the rear dolly arm 42.

Figure 1:
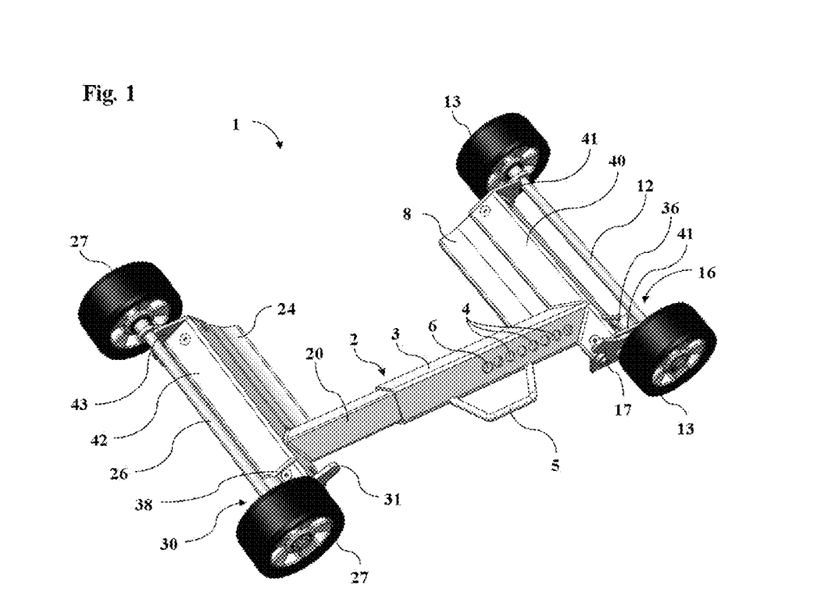
FIG. 1 is a rear perspective view of an illustrative embodiment of the self-loading mini dolly deployed in a collapsed and fully extended configuration preparatory to placement around the vehicle tire (not illustrated) of a vehicle which is to be towed in exemplary application of the dolly.
Figure 2:
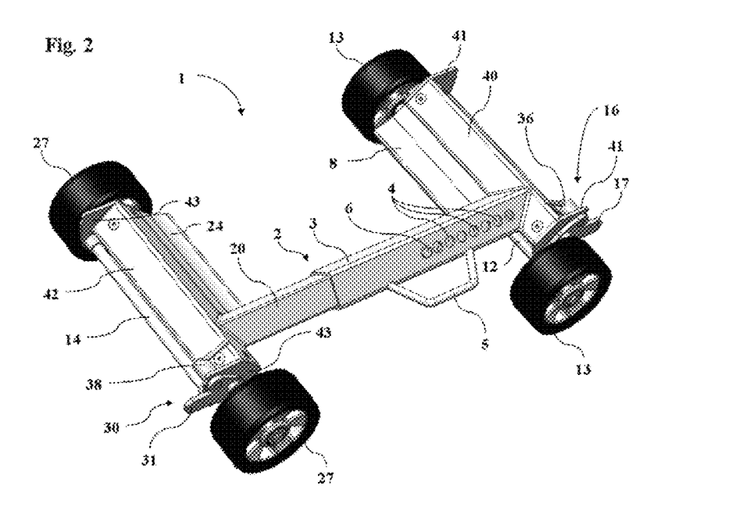
FIG. 2 is a rear perspective view of an illustrative embodiment of the self-loading mini dolly deployed in a raised and fully extended configuration preparatory to towing of a vehicle.

A front axle assembly 16 includes a front axle 12 provided on the front dolly arm 40. In some embodiments, the front axle 12 may be attached to the front dolly arm 40 via a pair of spaced-apart front axle flanges 41 which extend from the front dolly arm 40. A pair of front dolly wheels 13 is provided on the front axle 12. Similarly, a rear axle assembly 30 includes a rear axle 26 provided on the rear dolly arm 42. In some embodiments, the rear axle 26 may be attached to the rear dolly arm 42 via a pair of spaced-apart rear axle flanges 43 which extend from the rear dolly arm 42. A pair of rear dolly wheels 27 is provided on the rear axle 26. As illustrated in FIG. 2, in some embodiments, a tow bar 14 may extend between the rear axle flanges 43 for purposes which will be hereinafter described.

Figure 19:
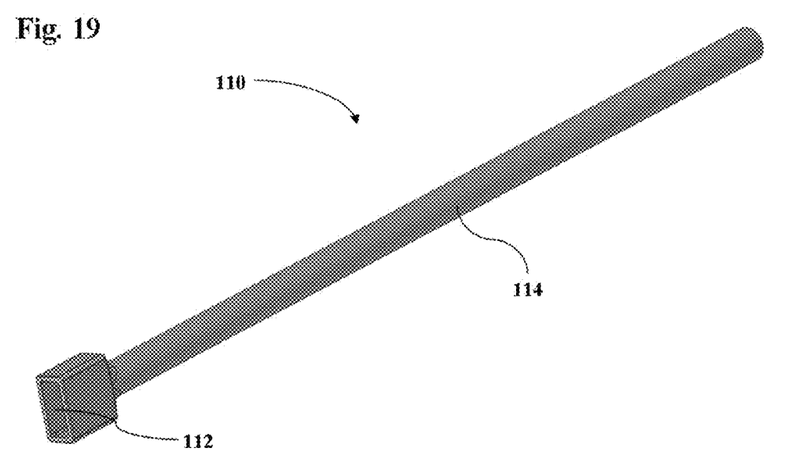
FIG. 19 is an illustrative embodiment of a leverage bar which may be used to raise and lower the self-loading mini dolly.

The front axle flanges 41 may pivotally engage the front dolly arm 40 and the front axle 12. The rear axle flanges 43 may pivotally engage the rear dolly arm 42 and the rear axle 26. Accordingly, as the front axle flanges 41 pivot relative to the front axle 12 and the front dolly arm 40 and the rear axle flanges 43 pivot relative to the rear axle 26 and the rear dolly arm 42, the dolly frame 2, with the front dolly platform 8 and the rear dolly platform 24, can be selectively deployed between the lowered position illustrated in FIG. 1 and the raised position illustrated in FIG. 2 for purposes which will be hereinafter described. A front lever 17 is provided on the front axle 12 and engages one of the front axle flanges 41 to facilitate selective raising and lowering of the dolly frame 2 and front dolly platform 8 on the front axle 12 such as by use of a leverage bar 110 (FIG. 19) having a leverage bar receptacle 112 on the end of an elongated leverage bar shaft 114. A rear lever 31 is provided on the rear axle 26 and engages one of the rear axle flanges 43 to facilitate selective raising and lowering of the dolly frame and rear dolly platform 24 on the rear axle 26 by use of the leverage bar 110 (FIG. 19). Accordingly, the leverage bar receptacle 112 receives the front lever 17 or the rear lever 31 as a user (not illustrated) grasps the leverage bar shaft 114 to selectively raise and lower the front axle assembly 16 or the rear axle assembly 30, respectively.

A front cam lock 36 is provided on the front axle flange 41 and engages the front lever 17 to selectively lock the front dolly platform 8 in the raised position. A rear cam lock 38 is provided on the rear axle flange 41 and engages the rear lever 17 to selectively lock the rear dolly platform 24 in the raised position. Therefore, the front axle lever 17 can be selectively manipulated to raise the front dolly platform 8 from the collapsed configuration illustrated in FIGS. 1, 5 and 7 to the raised configuration illustrated in FIGS. 2, 6 and 8 by use of the leverage bar 110 (FIG. 19) until the front cam lock 36 engages the front axle lever 17, thereby locking the front dolly platform 8 in the raised configuration. The rear axle lever 31 can likewise be manipulated to raise the rear dolly platform 24 from the collapsed configuration to the raised configuration by use of the leverage bar 110 (FIG. 19) until the rear cam lock 38 engages the rear axle lever 31, thereby locking the rear dolly platform 24 in the raised configuration.

Figure 9:
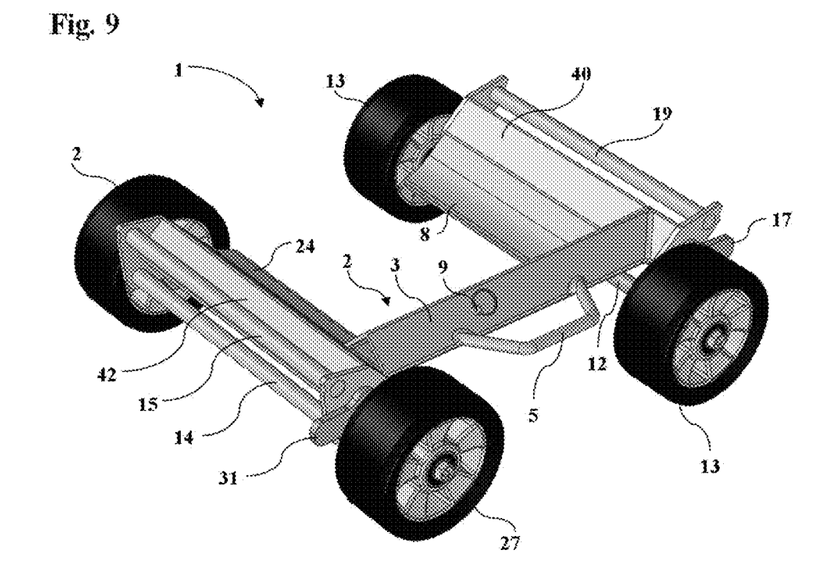
FIG. 9 is an outside perspective view of an illustrative embodiment of the self-loading mini dolly deployed in a raised and partially-extended configuration.
Figure 10:
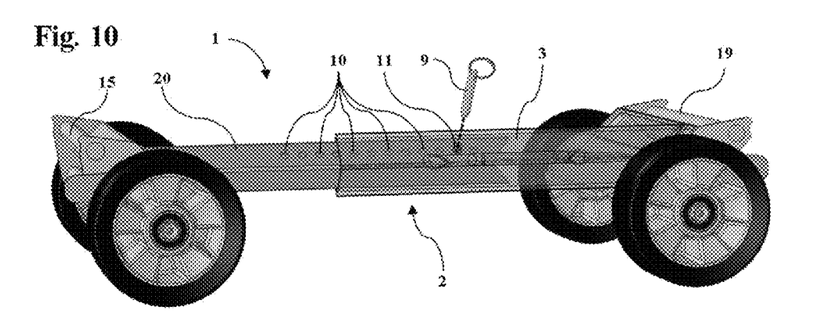
FIG. 10 is a rear perspective view of an alternative illustrative embodiment of the self-loading mini dolly deployed in a collapsed and fully extended configuration preparatory to placement around the vehicle tire (not illustrated) of a vehicle which is to be towed in exemplary application of the dolly.

As illustrated in FIGS. 3, 4, 9 and 10, in some embodiments, the dolly frame 2 may be selectively length-adjustable. Accordingly, the dolly frame 2 may include a generally elongated frame member receptacle 3 and a generally elongated frame member 20 which telescopically inserts into the frame member receptacle 3. The front dolly platform 8 may extend from the front dolly arm 40 and the rear dolly platform 24 may extend from the frame member 20. The frame member receptacle 3 may be selectively locked in non-sliding relationship to the frame member 20 to achieve a selected length of the dolly frame 2 by extending a lock pin 6 through a selected one of multiple receptacle openings 4 in the frame member receptacle 3 and through a selected registering frame member opening 11 (FIG. 10) in the frame member 20. As illustrated in FIGS. 9 and 10, in other embodiments, the receptacle openings 4 may be provided in the frame member 20 and the frame member opening 11 may be provided in the frame member receptacle 3. Alternative designs known by those skilled in the art may be used to render the dolly frame 2 length-adjustable.

Figure 6:
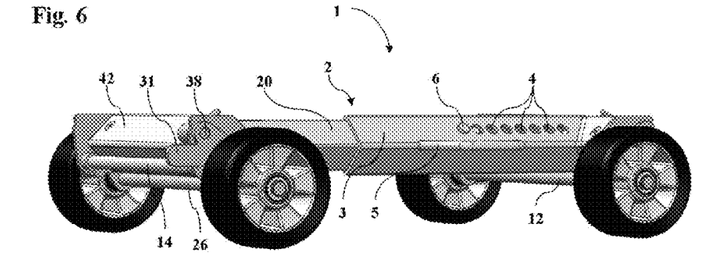
FIG. 6 is an outside side perspective view of an illustrative embodiment of the self-loading mini dolly deployed in a raised and fully extended configuration preparatory to towing.
Figure 7:
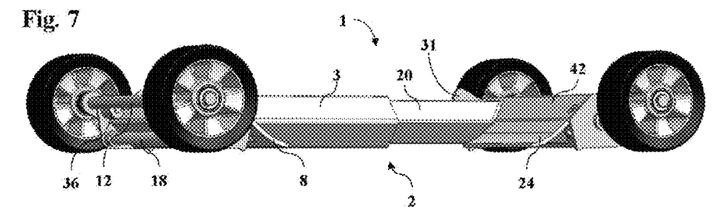
FIG. 7 is an inside side perspective view of an illustrative embodiment of the self-loading mini dolly deployed in a collapsed and fully extended configuration preparatory to placement around the vehicle tire (not illustrated)
Figure 8:
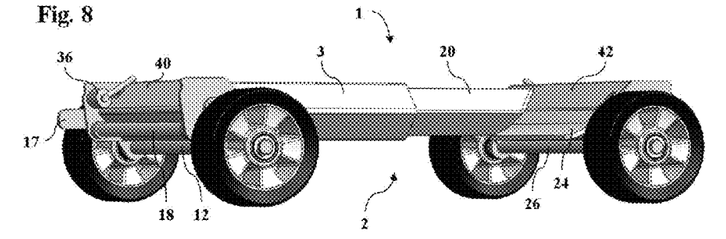
FIG. 8 is an inside side perspective view of an illustrative embodiment of the self-loading mini dolly deployed in a raised and fully extended configuration preparatory to towing of a vehicle.

In exemplary application, a pair of self-loading mini-dollies 1 can be used to raise whichever pair of vehicle wheels that remains on the pavement after the other pair of vehicle wheels is raised by the wheel lift of the towing vehicle 80. The front dolly platform 8 and the rear dolly platform 24 of each self-loading mini dolly 1 are initially placed beneath the front and rear portions, respectively, of the tire. The length of the dolly frame 2 may be adjusted to facilitate proper placement of the front dolly platform 8 and the rear dolly platform 24 beneath the tire. After the front dolly platform 8 and the rear dolly platform 24 have been properly placed and the length of the dolly frame 2 adjusted as necessary, the front axle lever 17 is manipulated by use of the leverage bar 110 (FIG. 19) to raise the front dolly platform 8 from the collapsed configuration illustrated in FIGS. 1, 5 and 7 to the raised configuration illustrated in FIGS. 2, 6 and 8 until the front cam lock 36 engages the front lever 17, illustrated in FIG. 4. The rear axle lever 31 is likewise manipulated by use of the leverage bar 110 (FIG. 19) to raise the rear dolly platform 24 from the collapsed configuration to the raised configuration until the rear cam lock 38 engages the rear lever 31, as illustrated in FIG. 6, thereby locking mini-dolly 1 in the raised configuration. Accordingly, the front dolly platform 8 and the rear dolly platform 24 raise and maintain the wheel of the vehicle in a raised position relative to the pavement (not illustrated) as the front dolly wheels 13 and the rear dolly wheels 27 support the raised dolly frame 2 and vehicle wheel above the pavement.

With the cam locks 36 and 38 engaged to keep each mini-dolly 1 from inadvertently collapsing, the towing vehicle 80 is then operated to tow the towed vehicle 84 as the self-loading mini dollies 1 continue to maintain the vehicle wheels in a raised position and the front dolly wheels 13 and the rear dolly wheels 27 travel on the pavement during towing. Therefore, the self-loading mini-dollies 1 allow vehicles, the wheels of which are unable to rotate because of damage, or transmissions that are engaged, or wheels that are locked by electric drive motors, to be towed, preventing the likelihood of excessive wear and/or damage to the drive train or wheels of the vehicle as may otherwise be the case if the vehicle wheels traveled on the pavement during the towing operation.

Figure 3:
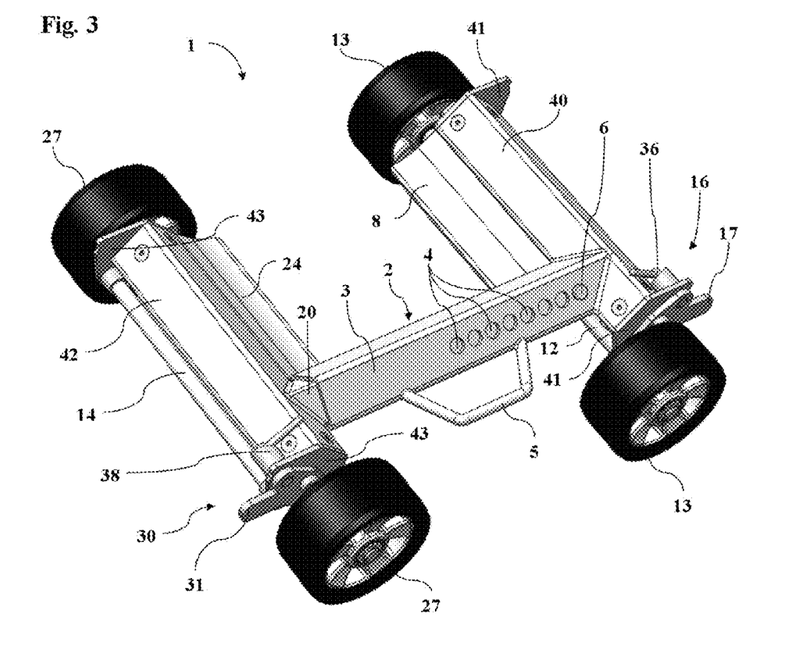
FIG. 3 is a rear perspective view of an illustrative embodiment of the self-loading mini dolly deployed in a raised and fully retracted configuration for compact stowing.
Figure 4:
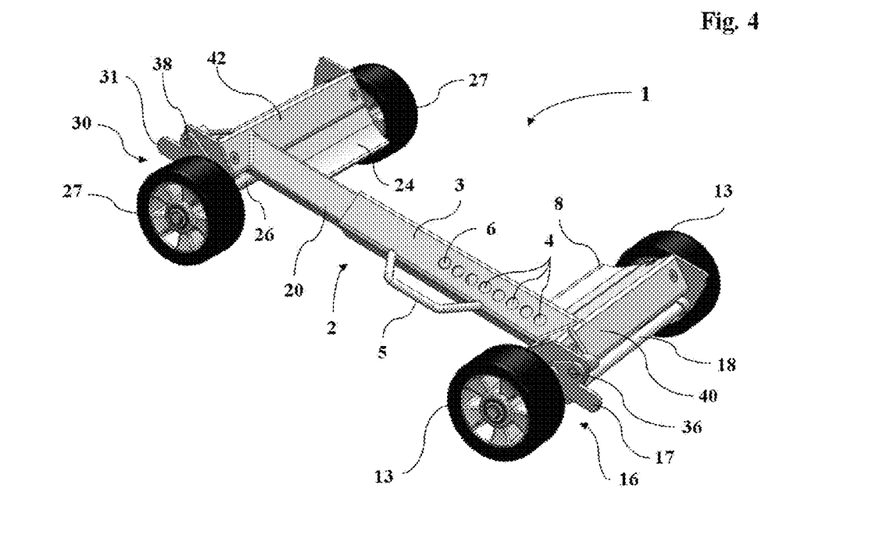
FIG. 4 is a front perspective view of an illustrative embodiment of the self-loading mini exemplary application of the dolly.
Figure 5:
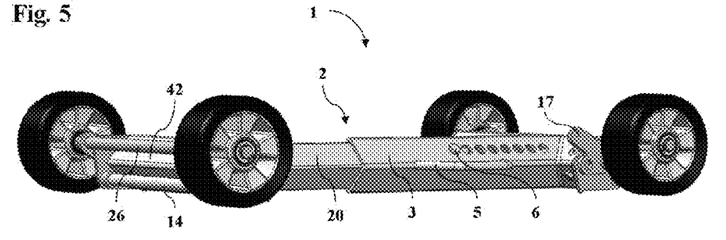
FIG. 5 is an outside side perspective view of an illustrative embodiment of the self-loading mini dolly deployed in a collapsed and fully extended configuration preparatory to placement around the vehicle tire (not illustrated)

After the vehicle has arrived at the desired destination, the self-loading mini-dollies 1 can be collapsed (FIG. 1) by operation of the leverage bar 110 (FIG. 19) on the respective front lever 17 and rear lever 31. The front dolly platform 8 and the rear dolly platform 24 are then lowered from beneath the vehicle tire as the mini-dolly is collapsed, after which the vehicle is lowered from the towing vehicle. It will be appreciated by those skilled in the art that the dolly frame 2 can be selectively shortened, as illustrated in FIG. 3, for compact stowing when not in use.

Referring next to FIGS. 11-16 of the drawings, the self-loading mini dolly 1 can be used in a variety of towing applications such as in the winching of a vehicle 84 (FIGS. 13 and 14) or a motorcycle 88 (FIG. 16) up the flat bed 81 of a towing vehicle 80 (FIG. 13) for towing of the vehicle 84 or motorcycle 88, for example and without limitation. Alternatively, a single mini dolly 1 may be used for lifting the disabled wheel or tire of a single vehicle or trailer for transport of the vehicle or trailer. As illustrated in FIGS. 11-14, in vehicle towing applications, a pair of self-loading mini dollies 1 can be used in conjunction with a vehicle tow bar 50 which facilitates secure attachment of the mini tow dollies 1 to the towing vehicle 80.

Figure 11:
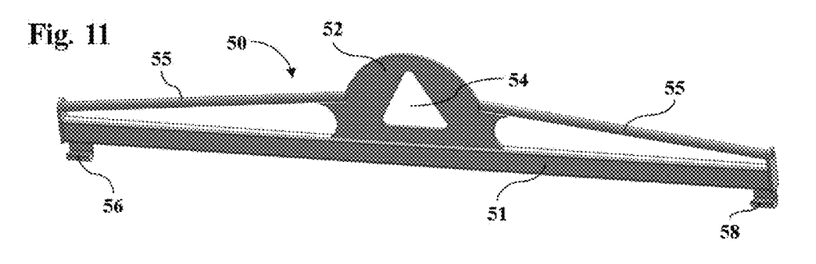
FIG. 11 is a perspective view of an exemplary vehicle tow bar which facilitates winching of a motorcycle or an automobile up a car carrier bed using one or a pair of self-loading mini dollies.

As illustrated in FIG. 11, the vehicle tow bar 50 may include a generally elongated tow bar frame 51. A tow bar plate 52 may extend from a middle portion of the tow bar frame 51. The tow bar plate 52 has a tow hook adaptor opening 54. A pair of plate reinforcing members 55 may extend from the respective ends of the tow bar frame 51 to the opposite sides of the tow bar plate 52 to reinforce the tow bar plate 52 on the tow bar frame 51. A pair of dolly attachment hooks 56, 58 may be provided at the opposite ends of the tow bar frame 51 to facilitate attachment of the vehicle tow bar 50 to the respective mini tow dollies 1 as will be hereinafter described.

Figure 13:
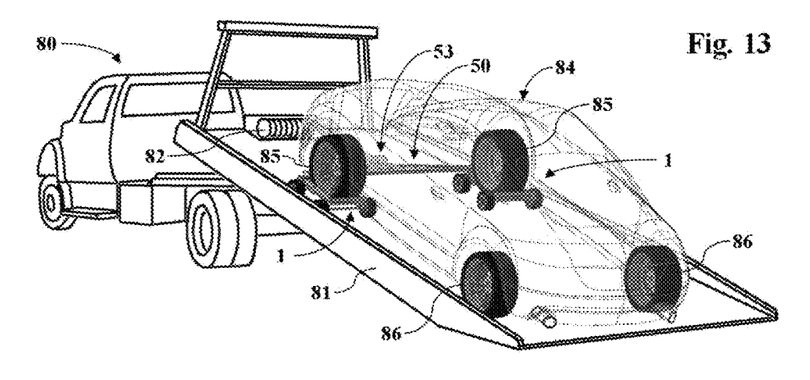
FIG. 13 is a perspective view of an automobile as the automobile is winched onto a car carrier bed, more particularly illustrating the front wheels of the automobile resting on a pair of self-loading mini dollies.
Figure 14:
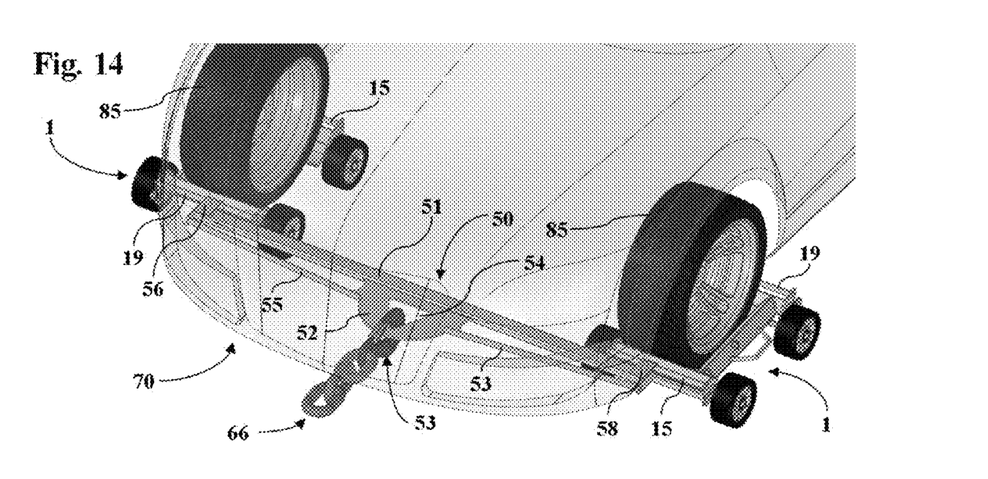
FIG. 14 is a perspective view of the front of an automobile, with the front wheels of the vehicle resting on a pair of self-loading mini dollies and a vehicle tow bar attached to the self-loading mini dollies in winching of the automobile.

As illustrated in FIG. 14, in an exemplary towing application, a pair of mini tow dollies 1 is initially operated to raise the respective front wheels 85 of the towed vehicle 84 typically in the same manner as was heretofore described. The vehicle tow bar 50 may be attached to the mini tow dollies 1 by engagement of the tow bar hooks 56, 58 to the cross bar 15 (FIG. 2) on each tow dolly 1. A tow hook 53 may be attached to the tow hook opening 54 in the tow bar plate 52 of the vehicle tow bar 50. A winch cable may be attached to towing chain 66 which may be attached to the tow hook 53. The winch cable attached to towing chain 66 is engaged by the vehicle winch 82 (FIG. 13) on the flat bed 81 of the towing vehicle 80. Accordingly, by operation of the vehicle winch 82, the vehicle 84 is winched from the pavement up onto the flat bed 81 of the carrier vehicle 80 as the mini dollies 1 transport the front wheels 85 of the vehicle 80. Additionally, two pair of mini dollies 1 may transport both front wheels 85 and rear wheels 86 of vehicle 80. The carrier vehicle 80 may then haul the vehicle 84 to a suitable destination for repair, for example.

After the vehicle 84 has arrived at the desired destination, the vehicle winch 82 is operated to lower the vehicle 84 from the flat bed 81 of the towing vehicle 80 onto the pavement. The tow hook 53 (FIG. 14) may be detached from the tow bar plate 52 of the vehicle tow bar 50, after which the vehicle tow bar 50 is removed from the cross bar 15 of the mini dollies 1. The mini dollies 1 can then be collapsed by operation of the respective front levers 17 and rear levers 31, thereby returning vehicle 84 to the pavement. The mini dollies 1 are then removed from beneath the vehicle tires.

Figure 12:
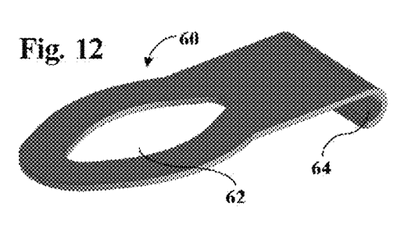
FIG. 12 is a perspective view of an exemplary tow hook adaptor which facilitates winching of a motorcycle up a car carrier bed using a self-loading mini dolly.
Figure 15:
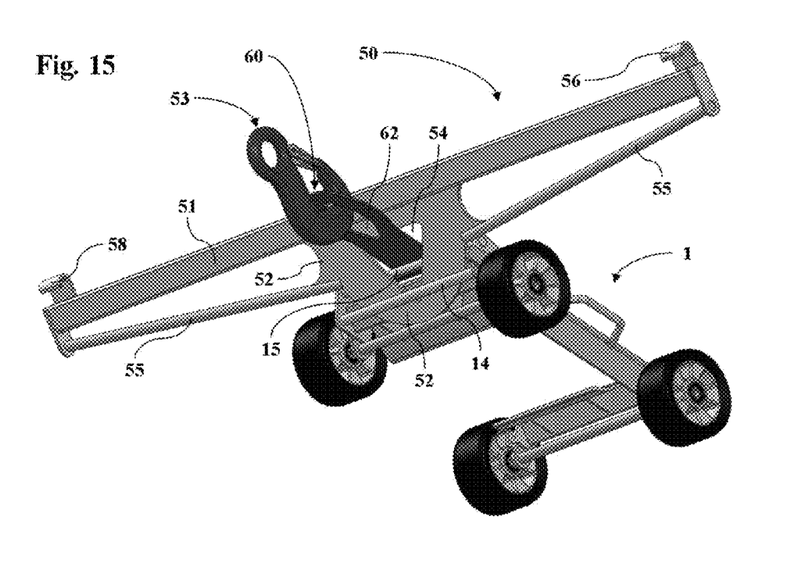
FIG. 15 is a bottom perspective view of a self-loading mini dolly with the vehicle tow bar and the tow hook adaptor attached to the self-loading mini dolly preparatory to winching of a motorcycle (FIG. 16)
Figure 16:
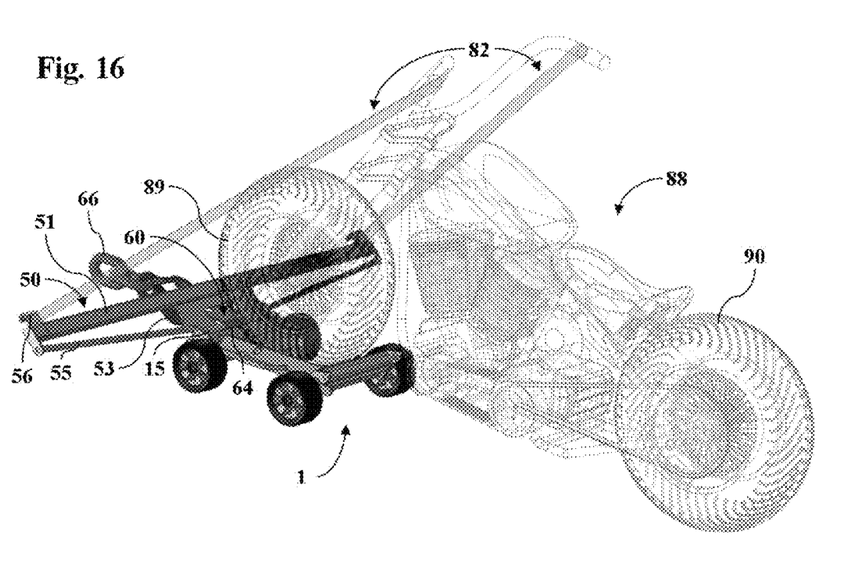
FIG. 16 is a rear perspective view of the self-loading mini dolly with the vehicle tow bar and the tow hook adaptor attached to the self-loading mini dolly and a motorcycle secured to the self-loading mini dolly, the vehicle tow bar and the tow hook adaptor in towing of the motorcycle.

As illustrated in FIGS. 15 and 16, in some applications, a mini dolly 1 can be used to tow a motorcycle 88. Accordingly, the mini dolly 1 is initially deployed in the collapsed configuration. A tow hook adaptor 60 (FIG. 12) may be attached to the cross bar 15 of the mini dolly 1 to facilitate attachment of the mini dolly 1 to the carrier vehicle 80 (FIG. 13). As illustrated in FIG. 12, the tow hook adaptor 60 may have a bracket opening 62 and a bracket clasp 64. The tow hook adaptor 60 may be attached to the mini dolly 1 by engagement of the adaptor clasp 64 with the cross bar 15 (FIG. 15). As illustrated in FIG. 15, a vehicle tow bar 50 may be inverted and inserted between cross bar 15 and cross bar 14 in the front of mini dolly 1 and the tow hook adaptor 60 extended through the tow hook opening 54 in tow bar plate 52, attaching adaptor clasp 64 (FIG. 15), to cross bar 15 (FIG. 15), on the front of mini dolly 1.

The front wheel 89 of the motorcycle 88 is placed on the mini dolly 1 and the rear wheel 90 typically remains on the pavement. The mini dolly 1 is then raised to lift the front wheel 89 off the pavement. A tow hook 53 is attached to the tow hook adaptor 60 by extending the tow hook 53 through the hook adaptor opening 62 and a towing chain 66 is attached to the tow hook 53. The vehicle winch 82 (FIG. 13) of the towing vehicle 80 is operated to pull the motorcycle 88 onto the flat bed 81 of the carrier vehicle 80 and the motorcycle 88 is transported to the desired destination.

After the motorcycle 88 has arrived at the desired destination, the vehicle winch 82 is operated to lower the motorcycle 88 from the flat bed 81 of the carrier vehicle 80 onto the pavement. The tow hook 53 may be detached from the tow hook adaptor 60, after which the vehicle tow bar 50 and tow hook adaptor 60 may be removed from the mini dolly 1. The mini dolly 1 can then be collapsed by operation of the front lever 17 and rear lever 31. The front dolly platform 8 and the rear dolly platform 24 are then removed from beneath the front wheel 89 of the motorcycle 88.

Figure 17:
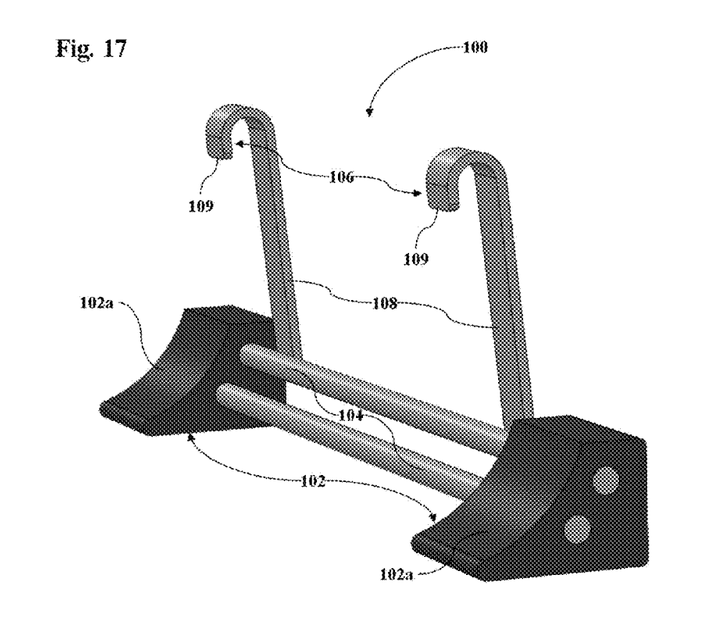
FIG. 17 is a front perspective view of an illustrative embodiment of safety chocks which attach to the rear of the mini dollies to prevent sudden unintended rollback during winching.
Figure 18:
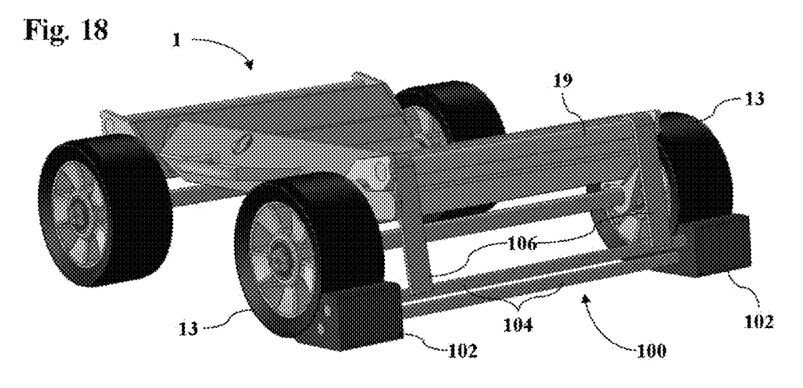
FIG. 18 is a rear perspective view of an illustrative embodiment of the safety chocks attached to the back of the self-loading mini dolly, deployed in a raised and fully retracted configuration.

Referring next to FIGS. 17 and 18 of the drawings, the mini dolly 1 may include a safety chock 100. The safety chock 100 may be attached to the rear axle 26 of the mini dolly 1 to prevent mini dolly 1 from sudden unexpected rollback down the carrier bed 81 (FIG. 13) of the towing vehicle 80 during towing of the towed vehicle 84. As illustrated in FIG. 17, the safety chock 100 may include a pair of spaced-apart safety chock base members 102. Each safety chock base member 102 may have a concave wheel-engaging surface 102a. At least one elongated base member connecting rod 104 may connect the safety chock base members 102. At least one dolly attachment member 106 may extend upwardly from the base member connecting rod 104. Each dolly attachment member 106 may include an attachment member shaft 108 which extends from the dolly attachment member 106 and an attachment hook 109 which terminates the attachment member shaft 108. Accordingly, as illustrated in FIG. 18, prior to towing the towed vehicle 84 (FIG. 13), a pair of the safety chock base members 102 may be placed on the flat bed 81 behind the respective self-loading mini dollies 1. The rear dolly wheels 27 of the mini dolly 1 engage the wheel-engaging surfaces 102a of the respective spaced-apart safety chock base members 102. The attachment hooks 109 of the respective dolly attachment members 106 receive the rear axle 26 of the mini dolly 1. Therefore, the safety chock 100 prevents each mini tow dolly 1 from inadvertently slipping downwardly on the flat bed 81 of the towing vehicle 80 during towing of the towed vehicle 84. After towing of the vehicle 84, the dolly attachment members 106 may be detached from the rear axle 26 prior to lowering the towed vehicle 84 from the flat bed 81.

While I have described my invention in connection with what I presently consider to be the most practical and preferred embodiment, it is to be understood that my invention is not limited to the described embodiments, but, on the contrary, I intend it to cover various modifications and equivalent arrangements included within the scope of the appended claims.

I claim:

1. A self-loading mini dolly comprising:
   a dolly frame;
   a front dolly arm carried by the dolly frame;
   a wheeled front axle carried by the front dolly arm;
   a front dolly platform carried by the front dolly arm, the front dolly platform selectively deployable between lowered and raised positions;
   a rear dolly arm carried by the dolly frame in spaced-apart relationship to the front dolly arm;
   a wheeled rear axle carried by the rear dolly arm;
   a rear dolly platform carried by the rear dolly arm, the rear dolly platform selectively deployable between lowered and raised positions;
   a front lever operably engaging the front dolly platform to selectively deploy the front dolly platform between the lowered and raised positions and a rear lever operably engaging the rear dolly platform to selectively deploy the rear dolly platform between the lowered and raised positions;
   a vehicle tow bar carried by the front dolly arm;
   a vehicle tow adaptor including:
     an elongated adaptor frame carried by the vehicle tow bar; and
     an adaptor plate carried by the adaptor frame; and
   a tow clip attachment bracket carried by the adaptor plate of the vehicle tow adaptor.

2. The self-loading mini dolly of claim 1 wherein the dolly frame is selectively length-adjustable.

3. The self-loading mini dolly of claim 2 wherein the dolly frame comprises a frame member receptacle and a frame member telescopically inserted in the frame member receptacle.

4. The self-loading mini dolly of claim 3 wherein the front dolly arm is carried by the frame member receptacle and the rear dolly arm is carried by the frame member.

5. The self-loading mini dolly of claim 3 wherein the front dolly arm is carried by the frame member and the rear dolly arm is carried by the frame member receptacle.

6. The self-loading mini dolly of claim 3 further comprising a plurality of receptacle openings in the frame member receptacle and a frame member opening in the frame member.

7. A self-loading mini dolly comprising:
   a generally elongated dolly frame;
   a generally elongated front dolly arm carried by the dolly frame in generally perpendicular relationship thereto;
   a pair of spaced-apart front axle flanges pivotally carried by the front dolly arm;
   a wheeled front axle pivotally carried by the front axle flanges;

a front dolly platform carried by the front dolly arm, the front dolly platform selectively deployable between lowered and raised positions by pivoting of the front axle flanges relative to the front dolly arm and the front axle;

a front lever operably engaging the front dolly platform to selectively deploy the front dolly platform between the lowered and raised positions;

a generally elongated rear dolly arm carried by the dolly frame in generally perpendicular relationship thereto and in parallel, spaced-apart relationship to the front dolly arm;

a pair of spaced-apart rear axle flanges pivotally carried by the rear dolly arm;

a wheeled rear axle carried by the rear axle flanges;

a rear dolly platform carried by the rear dolly arm, the rear dolly platform selectively deployable between lowered and raised positions by pivoting of the rear axle flanges relative to the rear dolly arm and the rear axle;

a rear lever operably engaging the rear dolly platform to selectively deploy the rear dolly platform between the lowered and raised positions;

a safety chock having a pair of spaced-apart safety chock base members adapted to engage wheels on the rear axle, at least one base member connecting rod connecting the safety chock base members and at least one dolly attachment member carried by the at least one base member connecting rod and adapted to engage the rear axle;

a vehicle tow bar carried by the front dolly arm;

a vehicle tow adaptor including:
an elongated adaptor frame carried by the vehicle tow bar; and
an adaptor plate carried by the adaptor frame; and a tow clip attachment bracket carried by the adaptor plate of the vehicle tow adaptor.

8. The self-loading mini dolly of claim 7 further comprising a front cam lock engaging the front lever and operable to selectively lock the front dolly platform in the raised position and a rear cam lock engaging the rear lever and operable to selectively lock the rear dolly platform in the raised position.

9. The self-loading mini dolly of claim 7 further comprising a safety chock having a pair of spaced-apart safety chock base members adapted to engage wheels on the rear axle, at least one base member connecting rod connecting the safety chock base members and at least one dolly attachment member carried by the at least one base member connecting rod and adapted to engage the rear axle.

10. The self-loading mini dolly of claim 7 wherein the dolly frame comprises a frame member receptacle and a frame member telescopically inserted in the frame member receptacle.

11. The self-loading mini dolly of claim 10 wherein the front dolly arm is carried by the frame member receptacle and the rear dolly arm is carried by the frame member.

12. The self-loading mini dolly of claim 10 wherein the front dolly arm is carried by the frame member and the rear dolly arm is carried by the frame member receptacle.

13. The self-loading mini dolly of claim 10 further comprising a plurality of receptacle openings in the frame member receptacle and a frame member opening in the frame member.

14. A self-loading mini dolly comprising:
a generally elongated dolly frame;
a generally elongated front dolly arm carried by the dolly frame in generally perpendicular relationship thereto;
a pair of spaced-apart front axle flanges pivotally carried by the front dolly arm;
a wheeled front axle pivotally carried by the front axle flanges;
a front dolly platform carried by the front dolly arm, the front dolly platform selectively deployable between lowered and raised positions by pivoting of the front axle flanges relative to the front dolly arm and the front axle;
a front lever operably engaging the front dolly platform to selectively deploy the front dolly platform between the lowered and raised positions;
a generally elongated rear dolly arm carried by the dolly frame in generally perpendicular relationship thereto and in parallel, spaced-apart relationship to the front dolly arm;
a pair of spaced-apart rear axle flanges pivotally carried by the rear dolly arm;
a wheeled rear axle carried by the rear axle flanges;
a rear dolly platform carried by the rear dolly arm, the rear dolly platform selectively deployable between lowered and raised positions by pivoting of the rear axle flanges relative to the rear dolly arm and the rear axle;
a rear lever operably engaging the rear dolly platform to selectively deploy the rear dolly platform between the lowered and raised positions;
a vehicle tow bar carried by the rear axle flanges;
a vehicle tow adaptor including:
an elongated adaptor frame carried by the vehicle tow bar; and
an adaptor plate carried by the adaptor frame; and
a tow clip attachment bracket carried by the adaptor plate of the vehicle tow adaptor.

15. The self-loading mini dolly of claim 14 further comprising a front cam lock engaging the front lever and operable to selectively lock the front dolly platform in the raised position and a rear cam lock engaging the rear lever and operable to selectively lock the rear dolly platform in the raised position.

16. The self-loading mini dolly of claim 14 wherein the dolly frame is selectively length-adjustable.

17. The self-loading mini dolly of claim 16 wherein the dolly frame comprises a frame member receptacle, a frame member telescopically inserted in the frame member receptacle, a plurality of receptacle openings in a first one of the frame member receptacle and the frame member and a frame member opening in a second one of the frame member receptacle and the frame member.

* * * * *